United States Patent
Aebischer et al.

(10) Patent No.: US 7,990,550 B2
(45) Date of Patent: Aug. 2, 2011

(54) METHOD AND SYSTEM FOR DETERMINING POSITION AND ORIENTATION OF AN OBJECT

(75) Inventors: Beat Aebischer, Heerbrugg (CH); Bernhard Braunecker, Rebstein (CH); Peter Kipfer, Marbach (DE)

(73) Assignee: Leica Geosystems AG, Heerbrugg (CH)

( * ) Notice: Subject to any disclaimer, the term of this patent is extended or adjusted under 35 U.S.C. 154(b) by 780 days.

(21) Appl. No.: 11/908,792

(22) PCT Filed: Mar. 3, 2006

(86) PCT No.: PCT/EP2006/060444
§ 371 (c)(1),
(2), (4) Date: Sep. 15, 2007

(87) PCT Pub. No.: WO2006/097408
PCT Pub. Date: Sep. 21, 2006

(65) Prior Publication Data
US 2009/0231582 A1    Sep. 17, 2009

(30) Foreign Application Priority Data
Mar. 17, 2005   (EP) .................................... 05102098

(51) Int. Cl.
*G01B 11/14*   (2006.01)
*G01B 11/26*   (2006.01)

(52) U.S. Cl. .................... 356/614; 356/139.03

(58) Field of Classification Search ................. 356/4.01, 356/4.09, 614, 623, 625, 73, 139.01–139.03; 250/202, 203.2, 221; 359/529
See application file for complete search history.

(56) References Cited

U.S. PATENT DOCUMENTS

| | | | |
|---|---|---|---|
| 4,714,339 A | | 12/1987 | Lau et al. |
| 4,866,362 A | * | 9/1989 | Parker et al. .................. 700/259 |
| 4,877,325 A | * | 10/1989 | Weule et al. .................. 356/622 |
| 5,174,385 A | * | 12/1992 | Shinbo et al. ................. 172/4.5 |
| 5,267,014 A | * | 11/1993 | Prenninger .............. 356/139.03 |
| 5,748,321 A | * | 5/1998 | Burks et al. .................... 356/635 |
| 5,771,978 A | * | 6/1998 | Davidson et al. .............. 172/4.5 |
| 5,974,348 A | * | 10/1999 | Rocks .............................. 701/28 |
| 6,047,783 A | * | 4/2000 | Mercer et al. .................... 175/45 |
| 6,049,377 A | * | 4/2000 | Lau et al. ........................ 356/73 |
| 7,230,689 B2 | * | 6/2007 | Lau .................................. 356/73 |
| 7,312,862 B2 | * | 12/2007 | Zumbrunn et al. ....... 356/139.03 |

(Continued)

FOREIGN PATENT DOCUMENTS

GB      1 027 457       4/1966

(Continued)

*Primary Examiner* — Sang Nguyen
(74) *Attorney, Agent, or Firm* — Maschoff Gilmore & Israelsen

(57) ABSTRACT

The invention relates to a positioning method for determining the position and orientation of a mobile unit having a receiver (3'), whereby the receiver (3') is detected by a scanner (2'), said scanner (2') determining at least the distance and a direction in relation to the receiver (3'). The radiation emitted by the sensor is detected by the receiver (3') and the direction of incidence of radiation and the direction of incidence of radiation in relation to an axis of reception are derived while an offset of the incident radiation in relation to the axis of reception (EA) is determined. Position and orientation of the unit are derived from at least the distance, the direction in relation to the receiver (3'), the offset and the direction of incidence as the position information and the unit is optionally controlled via the optical connection (OV).

24 Claims, 6 Drawing Sheets

U.S. PATENT DOCUMENTS

| | | | |
|---|---|---|---|
| 7,434,322 B2 * | 10/2008 | Walser et al. | 33/286 |
| 7,538,888 B2 * | 5/2009 | Hara et al. | 356/498 |
| 2003/0043362 A1 | 3/2003 | Lau | |
| 2004/0196451 A1 | 10/2004 | Aoyama | |

FOREIGN PATENT DOCUMENTS

| | | |
|---|---|---|
| GB | 2 281 833 | 3/1995 |
| WO | 98/07012 | 2/1998 |
| WO | 2005/031259 | 4/2005 |

\* cited by examiner

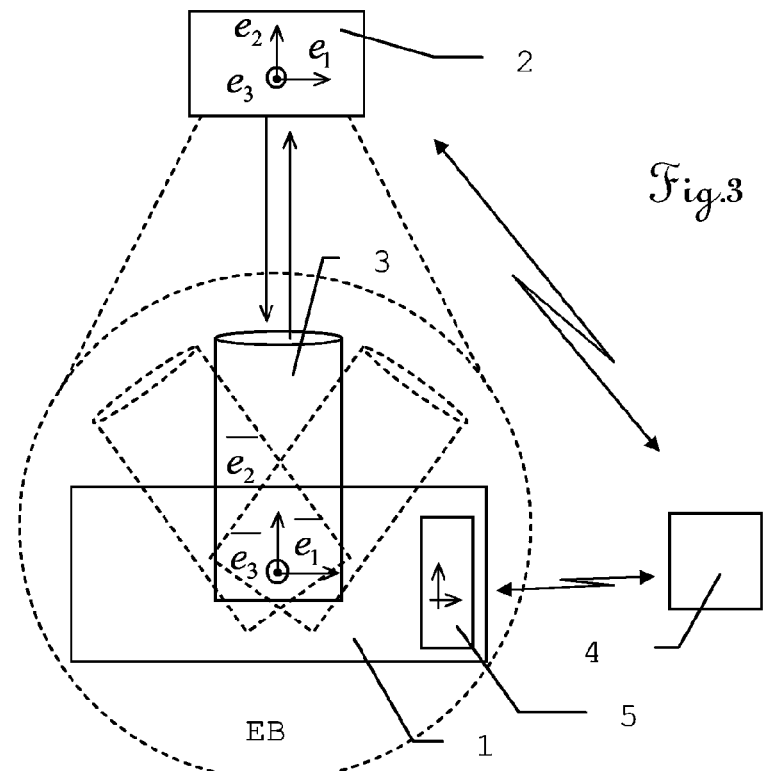
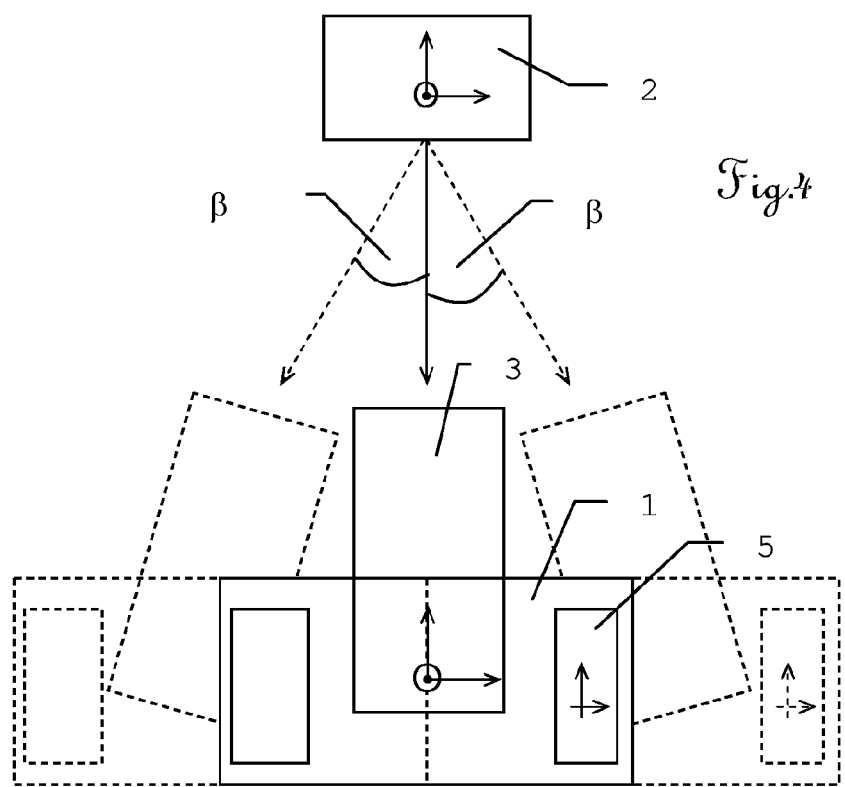

METHOD AND SYSTEM FOR DETERMINING POSITION AND ORIENTATION OF AN OBJECT

The invention relates to an attitude determination method, a moveable unit, an attitude determination system and a computer program product.

BACKGROUND

In many geodetic applications, methods and systems for attitude determination, i.e. for position and/or orientation determination, of an instrument used are employed. From a position determined using such a system, further measurements which are linked to the position and generally also require a knowledge of the orientation of the measuring instrument in space are then carried out. In principle, the orientation of the instrument can also be derived from the position determination of two or more points. For measuring applications, the 6 degrees of freedom of the handheld measuring instrument, but at least the position and hence 3 degrees of freedom, have to be determined for unambiguously fixing the absolute attitude. The problem therefore consists in the determination of position and orientation as two objects which in principle are achievable separately from one another but must be carried out with linkage for many applications. As a rule, both position and orientation of a generally hand-held measuring instrument are therefore required.

Methods and systems for determining the attitude of objects are required in many kinds of applications. Thus, for example, in geodetic applications, attitude information of a measuring instrument is often used, for example for incorporation of the measuring instrument into a ground coordinate system by measurement. From such a measuring instrument, further measurements are then generally carried out and linked to the attitude information. Another field of use is an automatic machine control, where the attitude of moving vehicles must be known as a basis of control. An attitude determination system for fixing the attitude of moving objects is also required in the marking of sports fields.

Known methods or systems for position determination are, for example, global position determination systems, such as GPS. Assuming undisturbed satellite reception, which is not always guaranteed, for example between rows of houses, in sports stadia, in building trenches or in mining, the position of an object can be determined by means of a GPS transmitter on the object. For fixing the orientation of the object, an additional orientation meter is required. The accuracy of the position data determined from GPS signals is, however, limited—particularly with regard to the height of an object—and is insufficient for many applications. Furthermore, the systems are increasingly inaccurate for moving objects or require greater complexity in the measurement.

Another frequently used method is position determination using tachometers or total stations. In particular, for position determination of moving objects, too, many kinds of embodiments of such systems are present in the prior art for automatic target tracking and surveying of moving objects. As a rule, only one position determination of the object moving independently of the total station is effected here. For determination of the orientation of the object, further measurements to the object can be carried out, for example by means of tilt sensors and a compass.

Other approaches for local positioning systems are based on passive points of known positions. Thus, for example, PCT/EP2004/010571 discloses a system for determining the actual position of a measuring instrument, in which at least two reference points located in a spatial segment scanned by a laser beam are detected and are measured with regard to their distance and their angle of inclination. From the known positions of these detectable reference points and the coordinated distances and angles of inclination, the actual position of the measuring instrument can be derived. The detection, tracking and measurement of the reference points is carried out in an automated procedure by the measuring instrument, the measuring instrument and specially formed elements coordinated with the reference points forming a local position and/or orientation measuring system. In this system, however the reference points must be actively scanned and illuminated using a laser beam, so that the receiving component in the measuring instrument requires a very complex design.

This type of position determination requires reference points which either have to be provided or must already be present. However, this precondition is often not met in open terrain—such as, for example, on sports fields or sports grounds. The erection of, for example, reflector staffs as reference points and the transport thereof make the method complicated.

Another approach for determining the attitude of a moveable unit comprises, in a first step, positioning a scanning unit, preferably a laser scanner, in a location suitable for a measurement to the unit, this location being known or being measured beforehand so that the position of the scanning unit is determined. A measurement of the position of the scanning unit can be effected using generally known methods of surveying technology, for example by means of a total positioning system or of a global positioning system. The scanning unit can, however, also be positioned and measured relative to a predetermined starting point. A measurement by means of the scanning unit is effected therewith from a position of known local or global coordinates.

A scanning unit of the generic type has a radiation source for emitting a laser beam or laser pulse, with which laser beam a solid angle region is scanned. Depending on the specifically chosen realisation of an embodiment, various scanning movements—among the prior art—can be chosen for the spatial segment.

Measured targets present in the spatial section scanned partly reflect the scanning radiation back to the scanning unit, by which the reflected radiation is received and evaluated—with regard to the distance to the measured target and the horizontal and/or vertical angle between an axis of the scanning unit and the measured target. The measured targets are generally distinguishable from the background on the basis of their reflectivity, so that they are recognised simply from the variation in the intensity of the reflected radiation. In addition, further measures for target detection or for automated surveying can also be used. The distance to a measured target detected during scanning of the solid angle region is measured by means of the scanning unit via the radiation reflected by the measured target, preferably by the phase measurement principle or the principle of pulse transit time measurement. Together with the angle information of the emitted radiation, the spatial position of the respective impingement site can be determined in relation to the scanning unit.

The angles to be determined depend here on the specific situation and the specified constraints. If, for example, a measurement is effected only in one plane, it is sufficient to determine the angle or angle component lying in this plane. In the general case, however, a distance and two angles are required for a position determination.

The position information about an object as a measured target or an object equipped with a reflective measured target is therefore obtained by passing a laser beam over a spatial region and detecting, identifying and measuring measured targets located in the spatial region by means of the scanning unit. If, during scanning of a spatial segment, the scanning unit receives no reflected radiation which can be coordinated with a measured target, a subsequent spatial segment is scanned. This search for the target can be effected, for example, via an automatic target searching device.

The scanning unit can scan one or more measured targets; according to the invention, the measured target of the scanning unit is a receiver or a moveable unit—an object—having a receiver which is formed so that it firstly receives a laser beam emitted by the scanning unit and—at least partly—reflects it back and secondly determines its orientation relative to the laser beam or relative to the angle of incidence of the laser beam. This can be effected in various ways.

The arrangement of the attitude determination system of the generic type, comprising scanning unit, receiver and control unit, is generally chosen so that the axis of rotation of the receiving optical system is vertical and the scanning laser beam of the scanning unit is horizontal relative to a reference plane, e.g. a surface. Preferably, after an initial adjustment, the receiving optical system automatically orients towards the scanning unit. The target search of the scanning unit likewise takes place automatically. For example, it is also possible to use a coarse search run for detecting the receiving optical system, which orients a component of the scanning unit suitable for detecting the receiving optical system so that no interaction with a user is required.

The computing unit can be operated as an external component of the system, for example by a user. However, embodiments comprising a computing unit integrated in the scanning unit or the receiver are also possible. The system is then controlled, for example, automatically from the scanning unit or from the receiver.

A receiver of the generic type is generally indirectly or directly connected in a defined manner to a moveable unit, and the attitude of the unit is thus determinable.

The unit to be surveyed may be, for example, a construction machine. It may also be a surveying instrument, the position and orientation of which are to be determined. A further field of use is the use for all types of marking work. This may be both markings for construction work and on sports grounds. For this purpose, the receiving apparatus is mounted, for example, on a mobile marking device for drawing or spraying lines or two-dimensional drawings, such as coats of arms, symbols or texts.

By means of the orientation determination relative to the beam axis, the receiver or the movable unit can be controlled by moving the radiation with its emission axis virtually as a control beam. For this purpose, the control unit is programmed or its hardware designed so that the deviation of the receiver axis from the emission axis is kept constant or reduced or minimized. Thus, each change of the control beam results in a correction of the attitude of the receiver or of the moveable unit. In a continuous sequence of such corrections, the moveable unit follows the moving control beam.

By guiding the control beam according to a predetermined pattern, the unit can be moved with pinpoint accuracy so that, for example, the surface can be changed with processing components. Thus, for example, figures of any desired shape can be marked as vector graphics on the Earth's surface. This permits, for example, the creation of complex club symbols on sports fields.

US 2003/043362 discloses a six-dimensional laser target tracking system according to the above principle. A tracker as a scanning unit measures the polar coordinates of the target, and the target or the receiver of a moveable unit determines its angle of rotation relative to a mathematical tripod which is defined by the beam direction and the polarization directions. This assumes that the tracker or scanning beam must strike a defined point of the receiver on the moveable unit; every incorrect sighting leads directly to an error in the polar coordinates of the moveable unit as the target to be surveyed. Thus, the laser beam of the transmitter of the scanning unit must accurately strike the entry pupil of the receiver optical system. If this is small or far away, the transmitter must sight very accurately in the sense of a "fine pointing link" in order to establish and to maintain the optical connection, but also in order to restore it after a disturbance. This presents problems particularly if the connecting components transmitter, medium or receiver are not stable relative to one another, either because of vibrations or air turbulence or if abrupt movements of the components break the optical connection, for example during movements over uneven ground. Here, the problems or the probability of the failure increase or increases with increasing distance so that there is also a limit with regard to the maximum realizable useful distance. Moreover, for achieving the required accuracies, the system components have to meet high requirements, in particular with regard to the mechanical system which is used for orientation and tracking and which must permit precise orientation and tracking without delay.

SUMMARY

An object of the present invention consists in providing a method or a system for determining position and orientation information of moveable units, which permits simplified design and operation.

A further object is to provide a method or a system for determining position and orientation information of moveable units, which has an improved optical link between system components.

A further object is to provide a method or a system for determining position and orientation information of moveable units, which has a greater range and/or greater robustness with respect to environmental influences, such as, for example, air turbulence or uneven ground.

The invention relates to an attitude determination method, a moveable unit, a scanning unit and an attitude determination system comprising these components. The approach is based on determination of the position of a moveable unit by a scanning system, for example a laser scanner. The determination of the orientation of the unit is effected by measurement of the attitude of a receiver arranged on the unit relative to the beam axis of the radiation emitted by the scanning unit. From the knowledge of the attitude of the receiver relative to the beam axis and a knowledge of the attitude of the receiver relative to a support component of the unit, the orientation of the unit can be derived. A knowledge of the attitude in three dimensions thus follows from the position information and the orientation information.

According to the invention, the attitude determination system or the attitude determination method is designed so that the receiver or the moveable unit additionally measures a beam offset of the laser beam relative to the receiver axis, which can also be interpreted as a sighting error. Here, two real parameters $w^1$ and $w^3$ which describe the attitude of the impingement point of the laser beam in the entry pupil of the receiver are measured. These parameters are taken into account in the calculation of position and rotational position of the receiver or of the moveable unit supporting it.

If the entry pupil is large relative to the cross-section of the laser beam or its impingement point, the laser beam can be moved therein to a certain extent in the manner of a "coarse pointing link" without the optical link being lost. As a result, the requirements with respect to the sighting accuracy of the tracker or the scanning unit and the receiver tracking are reduced.

It is therefore possible, even under unfavourable conditions, such as, for example, in the case of a vibrating transmitter, where methods of the prior art would constantly lose the link, not only to maintain this link but also to determine and to average the entry coordinates in the pupil and hence to eliminate the irrelevant vibrations or further influences, such as, for example, air turbulence. It is also possible according to the invention to permanently monitor the refraction of the transmission medium air therewith and to use it for quantitative correction.

The design according to the invention also results in constructional and system advantages. Thus, for example, the specifications for the scanning unit are relaxed. This can now react more slowly so that fewer complex motors or controls and a lower power consumption can be realised. Moreover, the accuracy can be increased and the frequency with which the scanning unit loses the link to the receiver is reduced. This is advantageous if the receiver moves or shakes abruptly, for example because it is mounted on a carriage which is travelling on uneven ground, for example a playing field to be marked or a building site. Atmospheric disturbances, as are relevant in particular during open-air applications or over long distances, can also lead to a loss of the link, which is now either in any case avoided or after which the restoration of the optical link is possible at all for the first time or is at least accelerated.

The receiver according to the invention may comprise a receiving optical system, an optical sensor and a tilt sensor, the receiving optical system preferably being formed both for receiving and for reflecting a laser beam—for example by means of an objective lens having a special coating. The scanning laser beam strikes the receiving optical system and is projected on to the optical sensor, for example a photo detector or a CCD array. On the basis of the image on the scanner, the direction of incidence of the laser beam relative to the sensor—and hence to the receiver or to a receiver axis—is determined. With the determination of the direction of incidence of the laser beam relative to a receiver axis, at least one first angle between scanning unit and receiver is established; in general, however, two angles can be determined by an appropriate design of the receiver. The lacking third angle of inclination can be measured, for example, by means of the tilt sensor, a biaxial inclination meter providing redundant information. This inclination information linked to the position information of the scanning unit can be considered as attitude information with respect to the receiver. The attitude of the receiver can then be determined, for example, by communicating the attitude information to a computing unit, and is processed by said unit. The communication can be effected, for example, on the basis of a link via cable or a wireless connection, for example a radio or ultrasound transmission. On the basis of the position and orientation information, the attitude of the receiver or of an object having a defined geometrical relationship therewith, for example of a vehicle as a moveable unit, is determined by means of the computing unit. A notebook with appropriate software may be, for example, such a computing unit, which communicates externally with the scanning unit and the receiver or, for example, may be integrated in the scanning unit or the receiver.

By designing the receiver with a beam splitter arranged downstream of a lens and two oppositely defocused detector components, it is also possible to determine the beam offset as a deviation of the impingement point of the laser radiation from the receiver axis on the basis of the pixels on the two detector components.

In the formation with the receiving optical system, optical sensor and tilt sensor or tilt indicator as components, the receiver is preferably in the form of a hand-held device having a housing containing the individual components. However, the components can also form the receiver as separate parts. A tilt indicator may also be, for example, a polarization filter coordinated with the optical system, so that an attitude determination relative to the polarization direction of the emitted radiation is effected.

An alternatively formed receiver envisages an additional reflective element for improved surveying by the scanning unit, so that the position information is obtained via a measurement to this reflective element. The reflective element may be, for example, a reflector mounted on the receiving optical system itself or on the housing thereof—for example triple prisms or spherical reflectors, or simply a reflective region—for example of reflecting foil—on the housing or connected in a defined manner to said reflectors or said reflective region.

The receiving optical system of the receiver is preferably rotatable about at least one fixed axis, in general an axis which is orthogonal to the optical axis of the receiving optical system and in particular vertical, i.e. it can orient or be oriented in the direction of the scanning unit. The angle through which the receiving optical system rotates or is rotated (the angle of rotation) is preferably determined automatically—for example by an angle sensor.

A receiver as a component of the attitude determination system according to the invention may also have further measuring functions which, for example, permit use as a geodetic instrument or integrated in such a device. For example, the receiver can be designed so as to be capable of use for hand-held surveying in the building sector by integrating a laser rangefinder.

BRIEF DESCRIPTION OF THE DRAWINGS

The attitude determination method according to the invention and the attitude determination system according to the invention, together with the components, are described or explained in more detail below purely by way of example with reference to working examples shown schematically in the drawings. Specifically.

FIG. 3 shows the schematic illustration of an attitude determination system of the generic type;

FIG. 4 shows the schematic illustration of an attitude determination system of the generic type having a moving receiving device;

DETAILED DESCRIPTION

Figure 1:
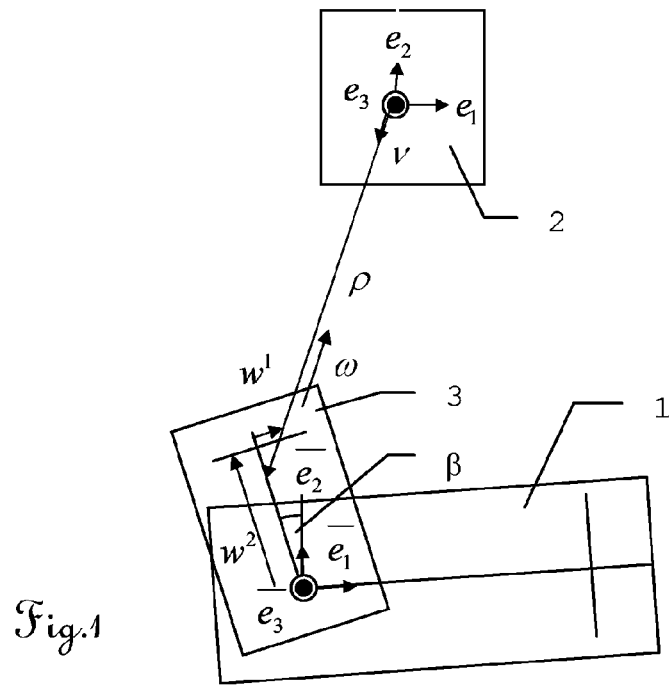
FIG. 1 shows the geometrical relationships on which the attitude determination method is based.

FIG. 1 illustrates the geometrical relationships on which the attitude determination method is based. A receiver 3 is mounted on a support component 1 of a moveable unit so as to be rotatable about a fixed axis, this axis being oriented orthogonally to the optical axis. For reasons of clarity, the diagram is shown in a plane and without inclinations relative to the horizontal. As a rule, however, a further axis is also realized for vertical adjustment of the receiver 3. By means of the scanning unit 2, a laser beam is emitted and an angle range is scanned until receiver 3 is detected and its distance measured. Consequently, both distance and angle to the impingement or reflection point on the receiver 3 are established and hence the position of the receiver 3 is determined. The direction of incidence of the radiation is determined by the receiver 3, so that the orientation with respect to this direction and hence with respect to the scanning unit 2 can be derived. The two systems scanning unit 2 and receiver 3 can be described by the two fixed right-handed coordinate systems $\{e_1,e_2,e_3\}$ and $\{\bar{e}_1,\bar{e}_2,\bar{e}_3\}$, the respective third unit vector being oriented perpendicularly to the plane of the page in the situation shown by way of example. Owing to the spatial extension of the receiver 3 and the arrangement of its components however, some variables have to be taken into account or determined in the modelling.

The scanning unit 2 now measures the distance $\rho>0$ and the first direction vector $v \in R^3$, $\|v\|=1$ to the impingement point on the receiver 3. The receiver measures the angle of rotation $\beta$ relative to the support component 1 of the moveable unit, and the second direction vector $\omega \in R^3$, $\|\omega\|=1$ from the impingement point to the laser source in the scanning unit 2. According to the invention, the coordinates $w^1$, $w^2$ and $w^3$ of the displacement vector w are measured or are known, for example, from a calibration or the technical specification. The component $w^3$ not shown in this figure is perpendicular to the plane of the page. From a knowledge of these parameters, the attitude of a specified point of the moveable unit or the support component 1 thereof can be determined taking into account the spatial extension and arrangement of the receiver 3. Equally, the knowledge permits control of the receiver 3 and unit so that this specified point is positioned or oriented relative to the first direction vector v as the beam axis of the emitted radiation. Thus, a system tracking the beam axis can be realized by this control.

Figure 2:
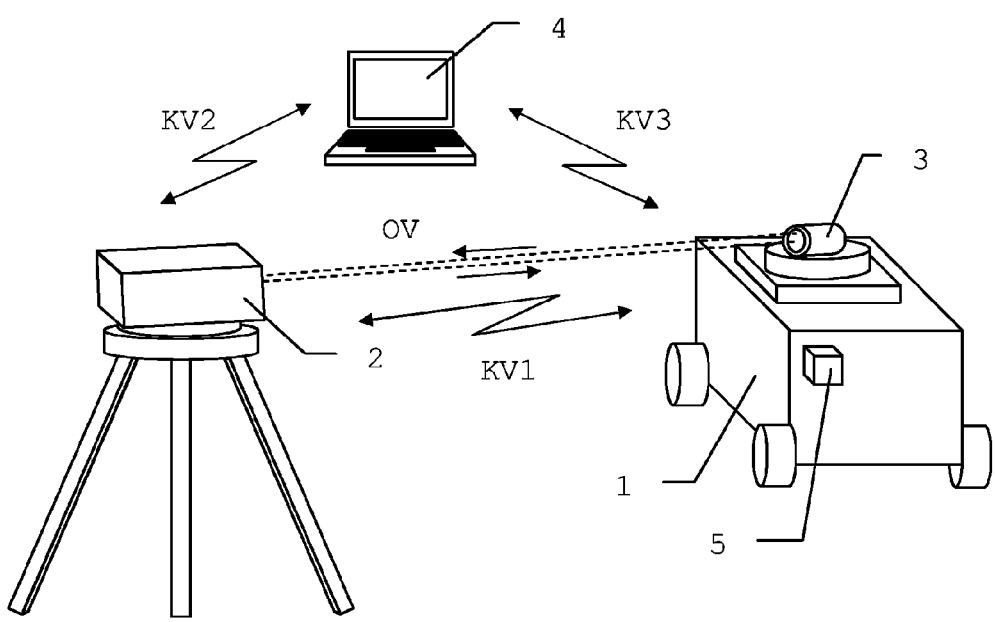
FIG. 2 shows a representational diagram of working examples of the system components of an attitude determination system of the generic type.

FIG. 2 shows a representational diagram of working examples of the system components of an attitude determination system of the generic type. The moveable unit has a support component 1 and a receiver 3 rotatable relative thereto, it also being possible to integrate a tilt meter 5 in the receiver 3 or the support component 1. The receiver 3 or one of its components is detected and surveyed by the scanning unit 2. During the procedure, receiver 3 and scanning unit 2 are in contact via an optical link OV. Via this optical link OV, the position of the receiver 3 and its orientation relative to the link OV and hence also to the scanning unit 2 are determined. The attitude information distance, direction to the receiver 3 and direction of incidence can be evaluated in an integrated control unit either in the receiver 3 or in the scanning unit 2 with regard to the position and orientation determination. For this purpose, the data obtained in each case at the other system component are transmitted via a communication link KV1 between receiver 3 and scanning unit 2. For certain applications, a separate control unit 4 can also be used, so that here the respective parts of the attitude information are transmitted via a communication link KV2 between scanning unit 2 and control unit 4 and via a communication link KV3 between receiver 3 and control unit 4. Receiver 3 and scanning unit 2 in turn can then be controlled by the control unit 4 and the communication links.

Directions are to be understood as meaning in each case one or more angles or the determination thereof, depending on existing circumstances and constraints. In an exact plane, for example on a sports field of plastic material, the degrees of freedom present are predetermined by the constraints of orientation and positioning in this plane. The number of measured variables which is required for determining position and orientation is thus reduced. If, for example, a vehicle having a sufficiently large horizontal dimension is used as support component 1, said vehicle is always leveled. An inclination measurement in two axes is therefore not necessary. The term direction determination includes the measurement of the necessary number of variables, depending on environmental conditions. For a vehicle in the plane, distance, direction to the vehicle, i.e. the polar angle, and receiving direction, i.e. likewise the polar angle of the received radiation, are then sufficient for determining position and orientation. In addition, the orientation of the receiver 3 relative to the support component 1 is also fixed by the constraints. In the above example, mobility of the receiver 3 relative to the support component 1 about a vertical axis is sufficient, so that here too a polar angle is sufficient for defining position and orientation of the support component 1 relative to the receiver 3.

FIG. 3 illustrates an attitude determination system of the generic type. The laser scanner in the scanning unit 2' emits radiation, for example laser pulses, and is controlled by the control device which is not shown in such a way that the scanner is aligned with the receiver 3'. Dashed lines represent a detection region EB which is scanned by the scanner. A laser beam emitted by the scanner strikes that objective lens of the receiver 3' which is coated with a coating having good reflectivity for the emitted radiation and is thrown back onto a detection device of the laser scanner which is not shown. Known local or global coordinates can be assigned to the fixed coordinate system $\{e_1,e_2,e_3\}$ of the scanning unit 2'. The laser scanner is adjusted to the coordinate system in such a way that the pivot point of the laser is at the origin. From this position of known coordinates, the measurement to receiver 3' is carried out. The scanner is rotatable about the tilt and vertical axis, the emission direction of the emitted laser beam being automatically detected, for example by means of angle sensors.

The support component 1' has a rotatable receiver 3' and a two-axis tilt sensor 5'. The origin of the fixed coordinate system $\{\bar{e}_1,\bar{e}_2,\bar{e}_3\}$ is located at the pivot point of the receiver 3', which is rotatable at least about the axis pointing out of the plane of the drawing. By measurement to the receiving optical system of the receiver 3', the coordinate system $\{\bar{e}_1,\bar{e}_2,\bar{e}_3\}$ thereof is related to that of the scanning unit 2'. The measurement from the laser scanner to the receiver 3' is effected, for example, to the objective lens thereon. Firstly, a laser beam is received by the objective lens and direction and point of incidence thereof are determined; secondly, the laser beam is reflected back from the objective lens to a detection device of the scanner, which device is not shown and which determines the distance between scanning unit 2' and receiver 3'. On the basis of the known geometry of the receiver 3', the distance to the support component 1' or to each point of the moveable unit is thus also determined.

The angle of rotation of the rotatable receiver 3' is determined automatically, for example by angle sensors, or is actively set up for tracking the control beam. Of course, the receiver 3' can also be formed in such a way that it is rotatable or tiltable about further axes. The values measured by the receiver 3' and the scanning unit 2' can be transmitted to an external control unit 4'.

FIG. 4 shows the schematic illustration of an attitude determination system of the generic type, having a moving receiving device. Analogously to the description for FIG. 3, a distance and direction measurement to the receiver 3' takes place from the scanning unit 2'. The situation shown in the middle shows an emission angle of 0°, and the left and right beams are emitted in each case at a certain emission angle β', β" to the 0° direction. If, after the detection and surveying of the receiver 3' shown in FIG. 3, the laser beam is now pivoted through the angle β', the support component 1' with the receiver 3' mounted thereon likewise moves to the right in order to maintain the existing relationship between the receiver axis and laser beam. If it is intended to keep the distance the same, a movement along an arc is effected. The linear displacement to the right which is shown here means the distance between scanning unit 2' and receiver 3' which increases with increasing displacement. The same considerations apply, with necessary changes, to the movement through the angle β" or to the left, which is likewise shown. Depending on the specified required profile or trajectory to be traveled, the necessary control commands are generated on the basis of the attitude information continuously produced by scanning unit 2' and receiver 3'. By the continuous surveying of the position of the receiver 3' and its link to the beam direction of the emission, guidance in the sense of "riding on the control beam" can be achieved.

Figure 5:
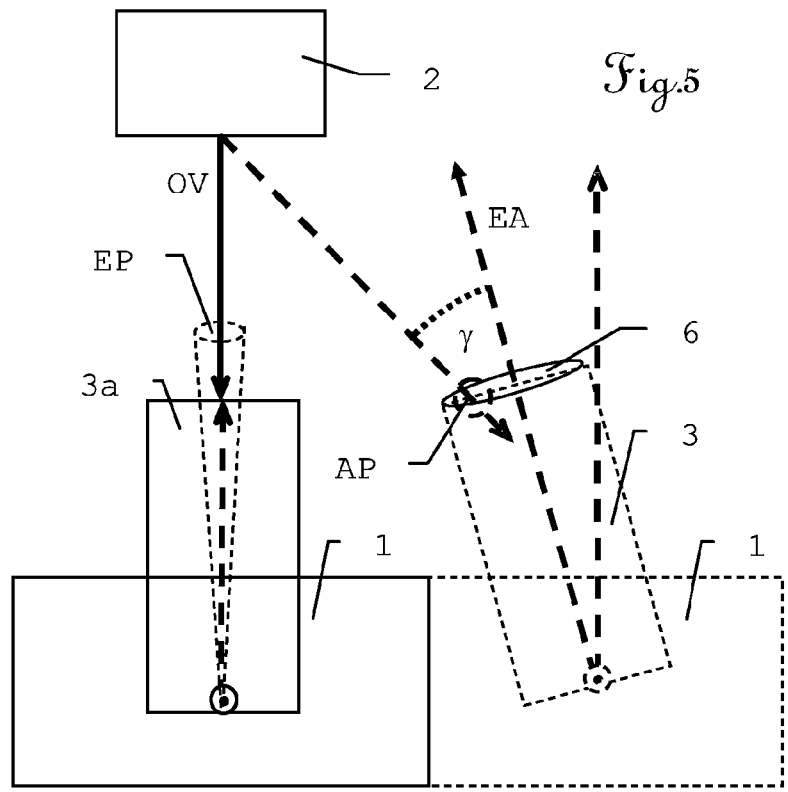
FIG. 5 shows the schematic illustration of the attitude determination method according to the invention.

FIG. 5 illustrates the principle of the attitude determination method according to the invention in comparison with a system of the prior art. In the distance and direction measurement from the scanning unit 2' to the receiver 3a, it is necessary in systems of the prior art to effect exact orientation and tracking of the optical link OV, which makes it possible always to keep the beam axis in the small entry pupil EP of the receiver 3a, which entails special requirements with regard to the tracking movement and the directional stability. Owing to the small entry pupil EP, incidence substantially parallel to the receiver axis is ensured, so that any errors due to a beam offset and the spatial extent of the receiver 3a can be neglected. If this orientation is changed beyond a threshold value and the link brought about therewith is broken, entry pupil EP and beam axis must be reoriented relative to one another or realigned with one another in order to establish an optical link OV again.

In the case of a receiver 3' according to the invention or an attitude determination system according to the invention, a larger entry pupil or optical aperture is used, so that the optical link is robust with regard to disturbances and the components for mutual tracking, scanning unit 2' and receiver 3', can be kept simpler or can meet reduced requirements. Owing to the dimensioning, however, it is now necessary also to determine the location or impingement point AP on the lens 6 or the beam offset as an offset of the incident radiation relative to the receiver axis EA or of the centre of gravity in the beam cross-section relative to the receiver axis EA, in addition to the direction of incidence of the laser radiation, which is described here in the plane by the angle of incidence γ. By the determination or a knowledge of these variables, it is possible to realise an optical aperture of appropriately large dimensions.

Figure 6A:
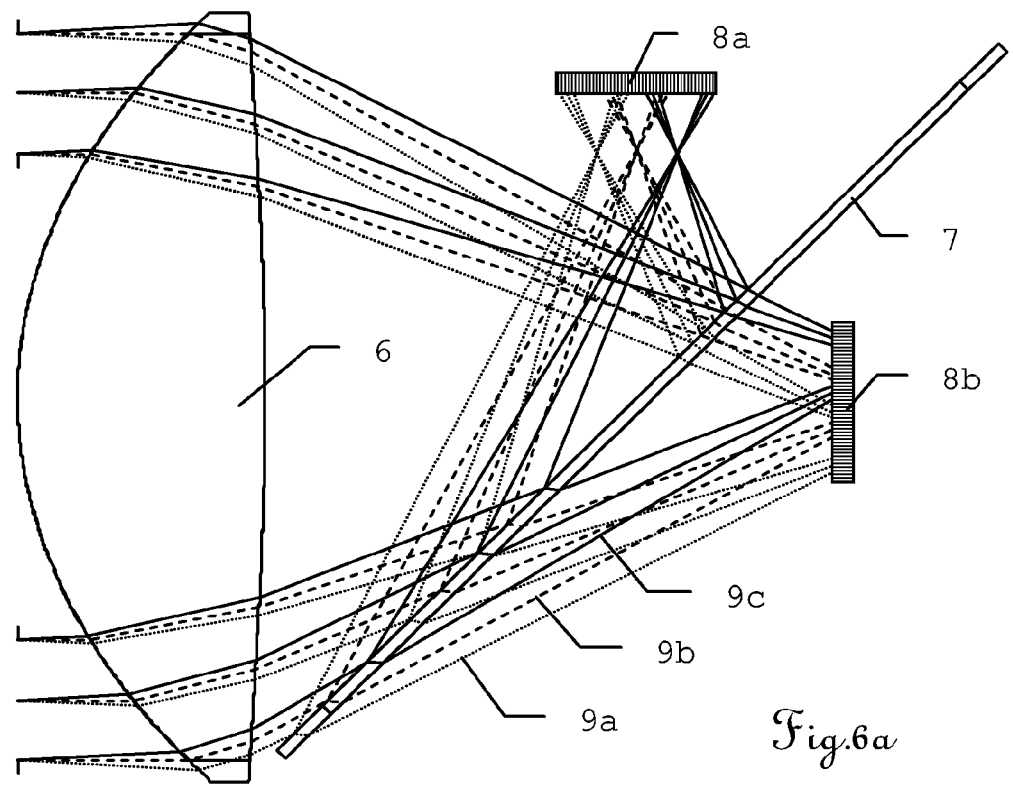
FIG. 6a-c show a schematic diagram of a working example for determining the direction of the incident radiation in the receiver of a unit according to the invention and FIG. 7a-d show a schematic diagram of the control of a marking truck with the use of an attitude determination method according to the invention.
Figure 6B:
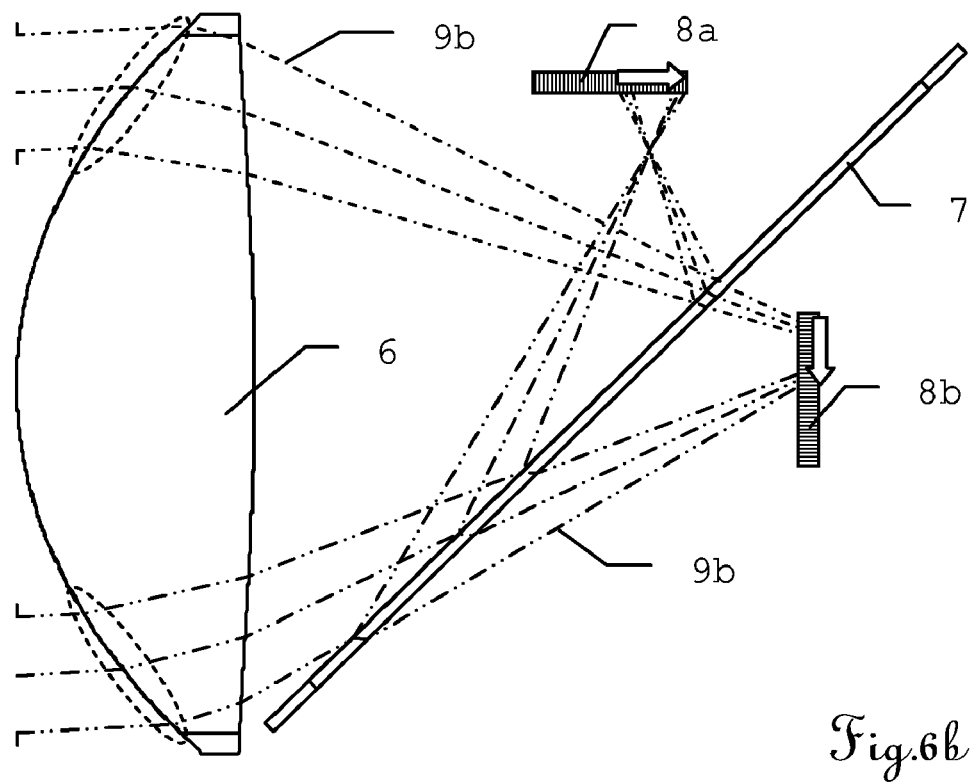
Figure 6C:
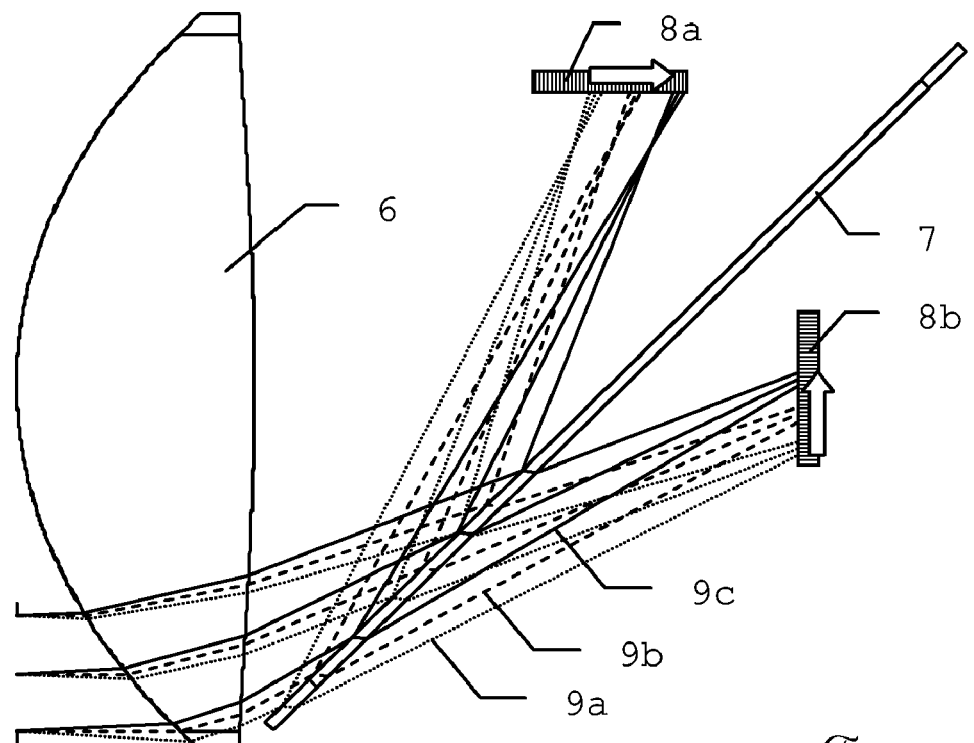

A schematic diagram of a working example for determining the direction of the incident radiation in the receiver of a unit according to the invention is shown in FIG. 6a-c. In this working example, an aspherical lens 6 having an aperture of 60 mm, a beam splitter 7 and two position-sensitive photosensitive detector components 8a and 8b is used. Suitable detectors are, for example, line arrays, CCD or CMOS cameras or position-sensitive devices (PSD). In FIG. 6a, the dashed line 9b corresponds to an incident beam which is parallel to the axis and leads to an image in the middle of the detector area. An incident beam from below which is indicated by solid line 9c leads to a shift of the image in the detector area upwards or to the right. An incident beam from above which is represented by dotted line 9a leads to a shift downwards or to the left.

In this working example, both detector components 8a and 8b are defocused in different directions. For example, the detector component 8a is present outside the focal distance and the detector component 8b within the focal distance of the lens 6. According to the invention, both the direction of incidence and the shift in the position of the impingement point of the radiation or the beam offset, i.e. the coordinates $w^1$ $w^3$ of the displacement vector w in FIG. 1, can be measured by this arrangement. If only one coordinate is considered on the two detectors, a change in the direction of incidence manifests itself in a shift of the pixel on both detector components 8a and 8b as a change of the sum of the corresponding detector coordinates, whereas a shift in the position of the beam, i.e. a beam offset, manifests itself in the change in the difference between the detector coordinates. The use of the two oppositely defocused detector components 8a and 8b thus permits the determination of direction of incidence and beam offset as a shift in the position of the impingement point of the beam and hence the determination of four parameters.

If, on the other hand, only the direction of incidence is to be determined, the use of one detector component in the focal plane is sufficient for determining the direction of incidence and hence two parameters. By means of such a design of the receiver optical system or receiver electronics, the direction of the incident radiation and a positional deviation can be easily detected and the receiver axis optionally caused to track.

A simultaneous determination of beam offset and angle of incidence is possible from a knowledge of the position of the pixels on the two detector components 8a and 8b, as will be explained in more detail below in FIG. 6b and FIG. 6c.

FIG. 6b shows two incident beams having different beam offsets relative to the receiver axis with the same angle of incidence. An incident beam in the upper part of the lens 6, which beam is indicated by line 9b' interrupted by dots, leads to a central pixel on the detector component 8a, whereas the position is in the vicinity of the upper edge on the detector component 8b. The incident beam with line 9b" interrupted by two dots and present in the lower part of the lens leads on the other hand to a pixel located at the right edge on the detector component 8a, whereas the pixel is centrally located on the detector component 8b. A beam offset as an offset of the incident radiation relative to the receiver axis can therefore be derived from a knowledge of the position of the two pixels. A shift of the impingement point from the upper part of the lens to the lower part and the associated change in the beam offset lead to a shift of the pixels to the right or downwards.

FIG. 6c on the other hand shows three incident beams with a constant beam offset but different angles of incidence, once again the dashed line 9b indicating an incident beam parallel to the axis, the solid line 9c indicating an incident beam from below and the dotted line 9a indicating an incident beam from above. Once again, a characteristic combination of pixels on the two detector components 8a and 8b is coordinated with each angle of incidence. A change in the angle of incidence from obliquely upwards to obliquely downwards leads to a shift of the pixel to the right on the detector component 8a and upwards on the detector component 8b. In comparison with the movement in FIG. 6b, the shift therefore takes place in opposite directions instead of clockwise in the same direction.

From a knowledge of the positions of the respective pixels on the detector components 8a and 8b and the shift thereof, both beam offset and angle of incidence as well as the change thereof can be determined.

In principle, it is also possible to realise alternative working examples for the optical system of the receiver of a unit according to the invention, for example with the use of a spherical lens and appropriately tilted detectors, it being possible for resultant distortions to be taken into account electronically.

Figure 7A:
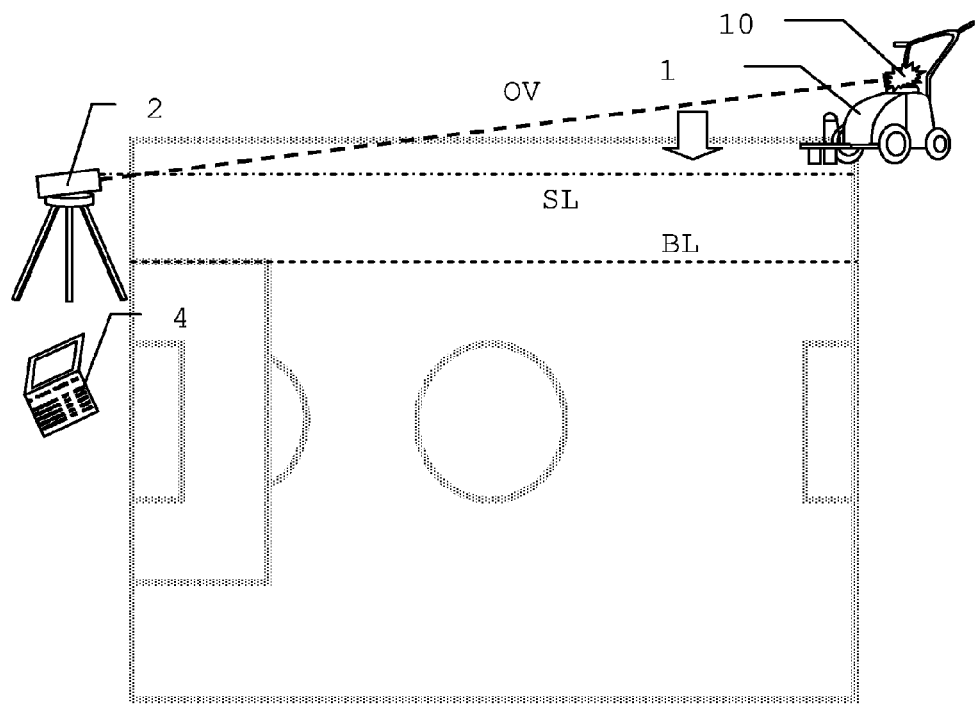

FIG. 7a-d shows a schematic diagram of the control of a marking truck 1" as a support component for the use of an attitude determination method according to the invention. A situation in which a sports field is to be provided with markings is shown. In FIG. 7a, the marking truck 1" is identified by the searching movement of the scanning unit 2" on the basis of a reflection 10 at the receiving optical system and is measured in direction and distance. The specification of the line to be marked is provided by a remotely positioned control unit 4" to be operated by an operator. The marking truck 1" is coupled by the optical link OV to the emission of the scanning unit 2". For marking a processing line BL which fixes one side of the penalty area, the marking truck 1" must be guided with its receiver axis to a theoretical line SL. In the example, this does not coincide with the processing line BL since, owing to the spatial distance between processing elements and the receiver axis, an offset is required in order to make the marking correctly. The electronics of the marking truck 1" controls the latter so that, at the distance specified for the position to be reached, the receiver axis is made to coincide with the axis of the emitted radiation, i.e. the optical link OV, or is kept within a specified deviation. By changing the optical link OV, it is thus possible to guide the marking truck 1" with the receiver axis on the theoretical line SL so that the marking can be made.

Figure 7B:
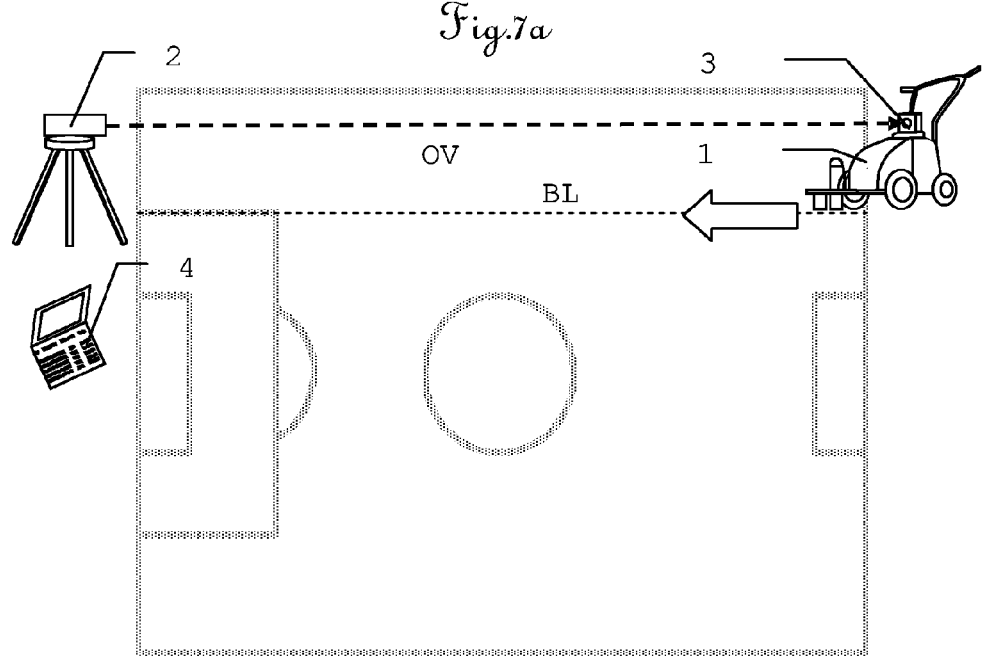
Figure 7C:
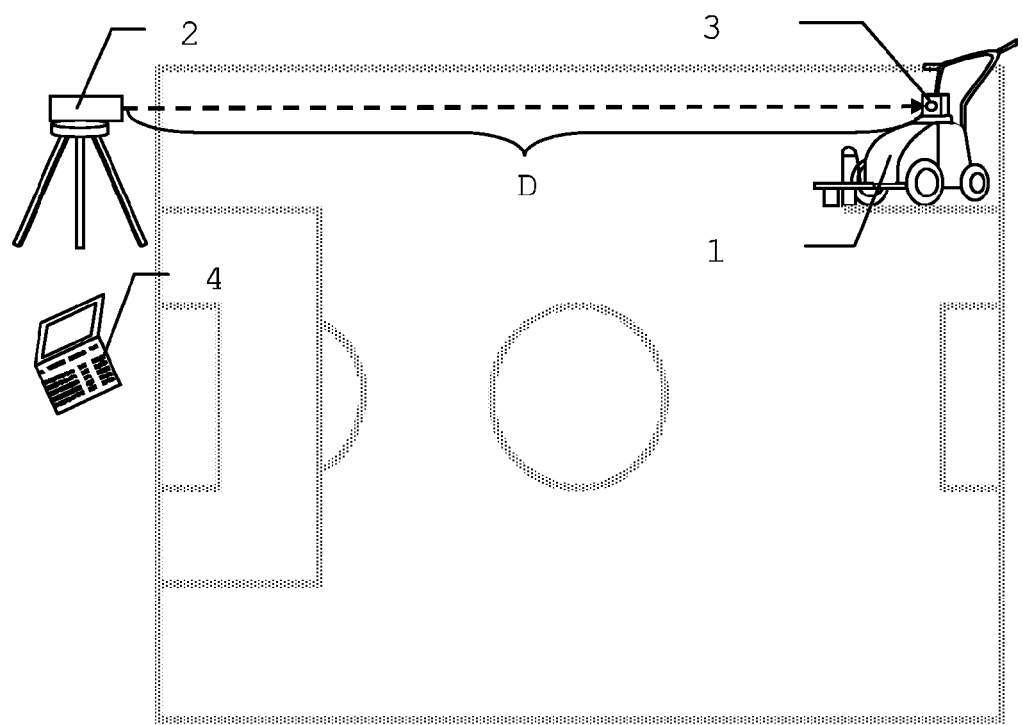

The agreement of optical link OV, receiver axis and theoretical line SL is shown in FIG. 7b. The receiver axis of the receiver 3" is aligned directly with the beam axis of the emission of the scanning unit 2". In this special case, the alignment of the receiver axis remains the same and the marking truck 1" moves, as shown in FIG. 7c, directly towards the scanning unit 2" for producing the marking, so that only the distance D decreases continuously. Other spatial arrangements result in a parallel change of direction of the receiver 3" and the distance D.

Figure 7D:
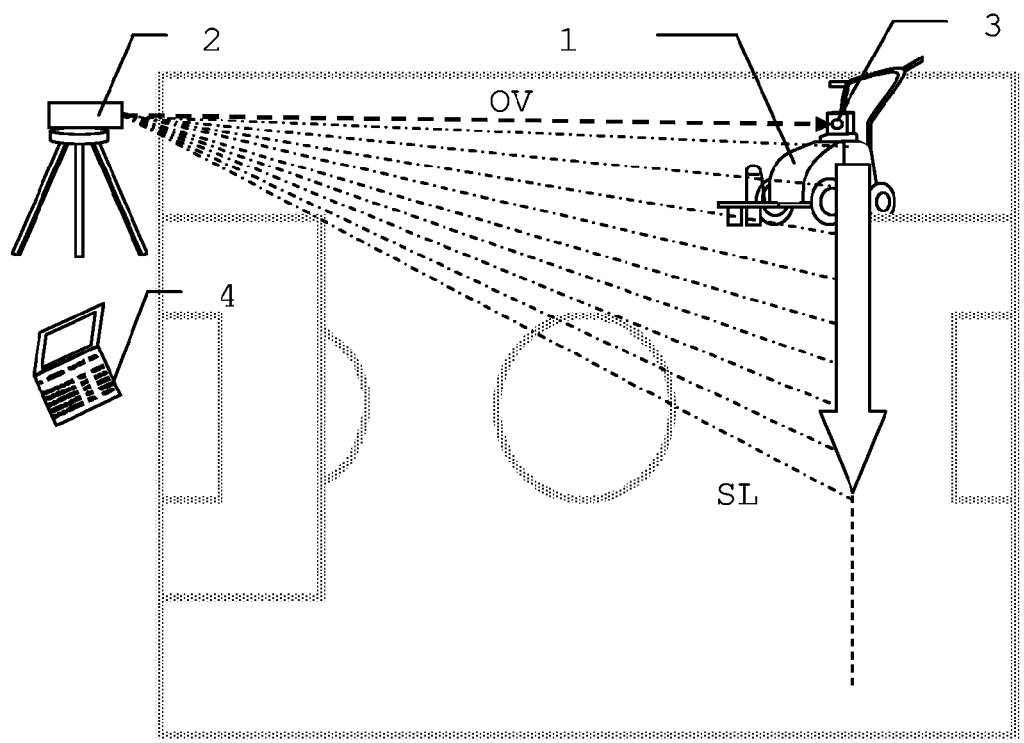

Such a case is shown schematically in FIG. 7d. After the marking truck 1" has marked the side of the penalty area, it is intended to mark an adjacent line running at right angles thereto. For this purpose, the theoretical line SL is continuously changed by the scanning unit so that the marking truck 1" follows this change by attempting to maintain the optical link OV. In addition, for making the marking correctly, the position of the receiver 3" relative to the marking truck 1" is also taken into account since the application unit is to be positioned as a distinct point. Under these geometrical conditions, both the angle between the receiver 3" and marking truck 1" and the distance vary continuously.

We claim:

1. An attitude determination method for guiding a movable unit by determining position and orientation of the moveable unit having a receiver including a scanning unit for scanning to detect the receiver by a laser beam, the scanning unit being capable of being positioned at a point of defined position, the receiver being formed for reception of the laser beam and being capable of being mounted on the movable unit, the method comprising:
    detecting the receiver by the scanning unit, the scanning unit determining at least a distance and a direction to the receiver;
    detecting the laser beam by the receiver and determining a direction of incidence of the laser beam relative to a receiver axis;
    determining the position and orientation of the unit from at least the distance, the direction to the receiver and the direction of incidence as attitude information, wherein the position of the impingement point of the laser beam in an entry pupil of the receiver is determined on detection of the laser beam, the entry pupil being large relative to the cross-section of the impingement point of the laser beam; and
    generating control commands usable for guiding the movable unit based on the attitude information.

2. An attitude determination method according to claim 1, wherein the scanning unit determines at least the distance by a phase or transit time measuring principle.

3. An attitude determination method according to claim 1, wherein the direction to the receiver is determined with a horizontal receiver angle and a vertical receiver angle, taking into account the position of the impingement point.

4. An attitude determination method according to claim 1, wherein the position of the impingement point is taken into account when determining the position.

5. An attitude determination method according to claim 1, wherein a mean value is calculated for a plurality of values of the position of the impingement point and/or the direction of incidence.

6. An attitude determination method according to claim 1, wherein an inclination measurement is effected during the determination of the position and orientation of the unit.

7. An attitude determination method according to claim 1, wherein the laser beam is emitted with a polarization direction and the polarization direction is detected by the receiver so that the attitude of the receiver relative to the polarization direction can be derived.

8. An attitude determination method according to claim 1, wherein a change in the attitude of the receiver and/or of the unit is controlled so that a predetermined orientation relative to the direction of incidence is included.

9. An attitude determination method according to claim 8, wherein the position and orientation of the unit is changed continuously by tracking the direction of incidence as a control beam.

10. An attitude determination method according to claim 1, further comprising transmitting at least parts of the attitude information from the scanning unit to the receiver and/or the unit, the receiver and/or the unit to the scanning unit, the scanning unit to a control unit and/or the receiver and/or the unit to the control unit.

11. An attitude determination method according to claim 10, wherein the transmission of the at least parts of the attitude information is transmitted via a radio, infrared, ultrasound, or cable link.

12. An attitude determination system for carrying out an attitude determination method according to claim 1, comprising:
    a radiation source for emitting a laser beam;
    a control component for guiding the laser beam in a scanning movement over a solid angle range;
    a measuring component for receiving the reflected laser beam and determining direction and distance to a reflection location of the laser beam, in particular according to the transit time or phase measurement principle; and communication means for transmitting direction and distance, the control component being formed so that the scanning movement is capable of being freely specified.

13. A moveable unit, comprising:

a support component; and a receiver for receiving a laser beam, the receiver being adjustable relative to the support component, and the receiver and the support component being formed and arranged so that the direction of incidence of the laser beam relative to a receiver axis is detectable and the position of the receiver relative to the support component is detectable, wherein the receiver is formed so that the position of the impingement point of the laser beam in an entry pupil of the receiver is capable of being determined, the entry pupil being large relative to the cross-section of the impingement point of the laser beam.

14. A movable unit according to claim 13, wherein the support component includes a drive, the receiver is rotatable about one or two axes, and the position of the receiver relative to the support component is detectable by at least one angle sensor.

15. A movable unit according to claim 13, wherein the receiver is formed so that the position of the impingement point is detected together with an angle of incidence of the laser beam.

16. A movable unit according to claim 13, wherein the receiver has an objective lens having at least one radiation-sensitive detector component which is position-sensitive with respect to the laser beam, the detector component being arranged in the focal plane.

17. A movable unit according to claim 16, wherein a beam splitter having at least two radiation-sensitive detector components which are position-sensitive with respect to the laser beam are arranged downstream of the objective lens, the detector components being arranged so as to be oppositely defocused.

18. A movable unit according to claim 13, further comprising a tilt meter.

19. A movable unit according to claim 18, wherein the tilt meter includes a biaxial tilt meter.

20. A movable unit according to claim 13, further comprising an element for reflecting the laser beam.

21. A movable unit according to claim 20, wherein the element for reflecting the laser beam is a reflective region of a receiver optical system of the receiver.

22. A movable unit according to claim 13, wherein the receiver is formed so as to be polarization-sensitive, so that the attitude of the receiver relative to the polarization direction is capable of being derived.

23. A movable unit according to claim 13, further comprising a processing unit for changing a surface.

24. A movable unit according to claim 21, wherein the processing unit is further configured to produce markings on a ground surface.

* * * * *

UNITED STATES PATENT AND TRADEMARK OFFICE
CERTIFICATE OF CORRECTION

| | | |
|---|---|---|
| PATENT NO. | : 7,990,550 B2 | Page 1 of 1 |
| APPLICATION NO. | : 11/908792 | |
| DATED | : August 2, 2011 | |
| INVENTOR(S) | : Beat Aebischer, Bernhard Braunecker and Peter Kipfer | |

It is certified that error appears in the above-identified patent and that said Letters Patent is hereby corrected as shown below:

Title page
Item (75), Inventors, change "Peter Kipfer, Marbach (DE)" to -- Peter Kipfer, Marbach (CH) --

Signed and Sealed this
Fifteenth Day of November, 2011

David J. Kappos
*Director of the United States Patent and Trademark Office*